United States Patent [19]

Ueda

[11] Patent Number: 4,697,734
[45] Date of Patent: Oct. 6, 1987

[54] AIR-MIX DOOR CONTROL APPARATUS FOR AN AIR CONDITIONER FOR AUTOMOBILE

[75] Inventor: Toshiaki Ueda, Katsuta, Japan

[73] Assignee: Hitachi, Ltd., Tokyo, Japan

[21] Appl. No.: 876,794

[22] Filed: Jun. 20, 1986

[30] Foreign Application Priority Data

Jul. 3, 1985 [JP] Japan .................. 60-144769

[51] Int. Cl.$^4$ ............................................. G05D 23/00
[52] U.S. Cl. ...................................... 236/13; 236/49;
165/16
[58] Field of Search .................. 236/13, 49, 1 B, 1 C;
62/239, 244, 243; 98/2.01, 2.11; 165/16, 30, 36, 42, 43; 251/129.13

[56] References Cited

U.S. PATENT DOCUMENTS 4,487,254 12/1984 Hayashibara .................. 165/16
4,585,163 4/1986 Cooley et al. .................. 236/49
4,607,789 8/1986 Bowman .......................... 236/49

FOREIGN PATENT DOCUMENTS 0108910 7/1983 Japan.

Primary Examiner—Harry Tanner
Attorney, Agent, or Firm—Antonelli, Terry & Wands

[57] ABSTRACT

An air-mix door control apparatus for an air conditioner of an automobile wherein an opening range of the air-mix door divides into three ranges on the basis of the relationship between the change ratio of opening of the air-mix door and the change ratio of the discharge air temperature. In the range where the change ratio of the discharge air temperature is great, the voltage applied to the air-mix control motor is changed over to a low voltage, in the range where the change ratio of the discharge air temperature is small, the voltage applied to the air-mix control motor is changed over to a high voltage. In the range where the change ratio of the discharge air temperature with respect to the change of opening of the air-mix door is great, changing of the air-mix door can be prevented. In the range where the change ratio of discharge air temperature with respect to the change of opening of the air-mix door is small, the responsiveness of the air-mix door can be improved.

6 Claims, 6 Drawing Figures

AIR-MIX DOOR CONTROL APPARATUS FOR AN AIR CONDITIONER FOR AUTOMOBILE

BACKGROUND OF THE INVENTION

The present invention relates to an air-mix door control apparatus of an air conditioner for automobile and, more particularly, to an air-mix door control apparatus of an air conditioner for automobile which controls the opening of an air-mix door by driving of a motor.

In, for example, Japanese Utility Model Laid-Open No. 108910/1983 a motor driving type air-mix door control apparatus is proposed, in which a power source voltage of a motor is set to a higher level at both end portions of a rotating angle of an output shaft of a motor actuator, in the vicinity of a maximum cooling position and a maximum warming position of an air-mix door, than at an intermediate portion of the rotating angle of the output shaft of the motor actuator in order to improve the air tightness at the both end portions of opening of the air-mix door.

However, the change ratio of a discharge air temperature with respect to the change of opening of the air-mix door is so great near both the maximum cooling position and the maximum warming position that control of the air-mix door becomes unstable in these ranges and further changing of the opening of the air-mix door is likely to occur in these ranges.

If a setting is made in such a manner so as to minimize the change ratio of the discharge air temperature with respect to the change of opening of the air-mix door, the moving driving speed of the air-mix door would drop at the intermediate position of the opening of the air-mix door and the effectiveness of the air-mix door of the discharge air temperature to the set air temperature would drop.

An object of the present invention is provide to an air-mix door control apparatus of an air conditioner for automobile wherein a change ratio of a discharge air temperature with respect to a change of opening of an air-mix door throughout the entire opening range of the air-mix door is constant.

Another object of the present invention resides in providing an air-mix door control apparatus of an air conditioner for automobile wherein a control of an air-mix door control motor in a range in which a change of actual discharge air temperature is drastic with respect to a change of an actual opening of an air-mix door is stabilized.

A further object of the present invention resides in providing an air-mix door control apparatus of an air conditioner for automobile with a high effectiveness of an air-mix door control motor in range in which a change of an actual discharge air temperature is gentle with respect to a change of an actual opening of an air-mix door can be attained.

In order to accomplish the objects described above, the present invention provides an air-mix door control apparatus of an air conditioner for automobile having speed correction means for correcting the rotational speed of an air-mix door control motor in accordance with the control state or the control condition of an air-mix door.

In accordance with the present invention the opening range of the air-mix door is divided into a plurality of ranges on the basis of the relationship between the change ratio of opening of the air-mix door and the change ratio of the discharge air temperature, with a suitable motor speed being set for each of the divided ranges, and with the rotational speed of an air-mix door control motor for driving the air-mix door being changed in each range.

According to the present invention, the rotation speed of the motor for driving the air-mix door control apparatus of the air conditioner for an automobile is controlled and changed over in accordance with the change ratio of the blow-out air temperature with respect to the change of opening of the air-mix door.

Accordingly, the present invention can improve the control stability of the air-mix door control apparatus of the air conditioner for automobile and the responsibility of the air-mix door of the blow-out air temperature to the set air temperature.

DETAILED DESCRIPTION

Figure 1:
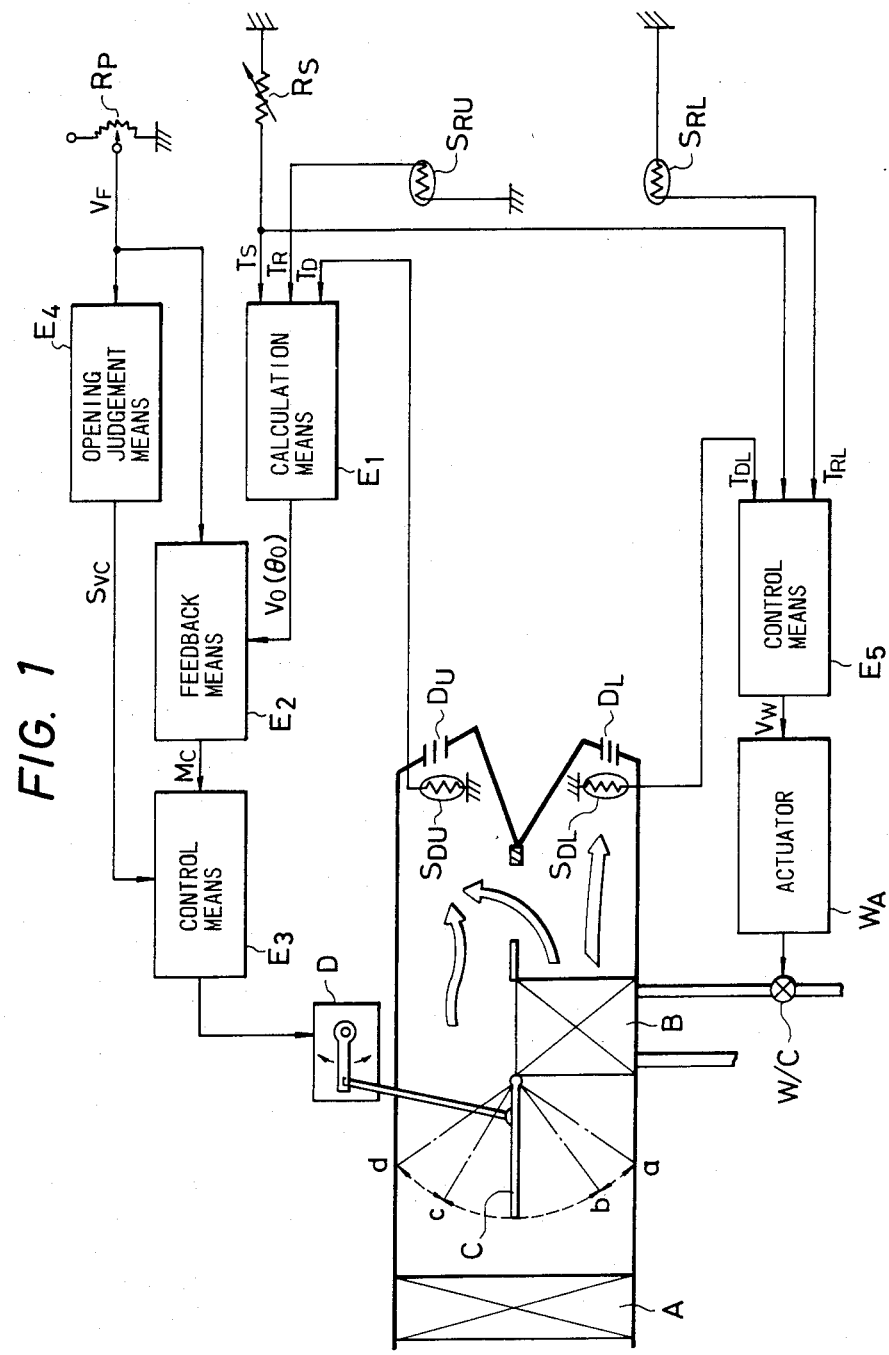
FIG. 1 is a schematic view of an air-mix door control apparatus of an air conditioner for automobile in accordance with the present invention.

Referring now to the drawings wherein like reference numerals are used throughout the various views to designate like parts and, more particularly, to FIG. 1, the principle of an air-mix door control apparatus of an air conditioner for an automobile in accordance with the present invention will be described. As shown in FIG. 1, air cooled by an evaporator A is divided by an air-mix door C into a portion which is reheated by a heater core B and another portion which bypasses the heater core B. A portion of the re-heated hot air flows into a duct communicating with an upper discharge air duct port $D_U$ where the re-heated hot air is mixed with the cool air and turned to conditioned air. The rest of the re-heated hot air is blown out from a lower or floor discharge air duct port $D_L$.

The target air temperature of the conditioning air discharged from the upper discharge air duct port $D_U$ is calculated by a calculation means $E_1$ from an output signal $T_S$, from a temperature setter $R_S$, and an output signal $T_R$ from an upper air temperature sensor $S_{RU}$. The calculation means $E_1$ calculates and outputs a control angle signal $\theta_o$ of the air-mix door C as a target opening voltage signal $V_O$ in order to bring the temperature differential between the target air temperature and the actual air temperature $T_D$, detected by an upper duct air temperature sensor $S_{DU}$, close to zero.

Feedback means $E_2$ outputs a coated motor control signal $M_c$ in accordance with a voltage differential between an output voltage $V_f$ of a potentiometer $R_p$ adapted to detect an actual opening of the air-mix door C and the target opening voltage signal $V_o$. Control means $E_3$ applies a voltage, having a polarity in accordance with the code of the coded motor control signal $M_c$, to the motor D for controlling the air-mix door C until the coded motor control signal $M_c$ disappears.

Opening range judgement means $E_4$ of the air-mix door C compares the output voltage $V_f$ of the potentiometer Rp with a predetermined reference signal, judges in which of the ranges a–b, b–c and c–d the air-mix door C exists and from which and to which ranges the air-mix door C moves, and generates a voltage change-over signal $S_{VC}$ on the basis of the result of judgement of the opening range judgement means $E_4$.

Control means $E_3$ functions to change over the voltage to be applied to the air-mix door control motor D such as 8 V, 10 V and 12 V on the basis of the voltage change-over signal $S_{VC}$ generated from the opening range judgement means $E_4$.

When the voltage applied to the air-mix door control motor D is changed in accordance with the opening range of the air-mix door C, the rotation speed of the air-mix door control motor D changes in each range. As a result, the change ratio of the blow-out air temperature with respect to the change of opening of the air-mix door C assumes a value which corresponds to each opening range of the air-mix door C.

In the range where the change ratio of the blow-out air temperature is great, the voltage applied to the air-mix control motor D is changed over to a low voltage, in the range where the change ratio of the blow-out air temperature is small, the voltage applied to the air-mix control motor D is changed over to a high voltage.

Therefore, it is possible to stabilize the control system in the range where the change ratio of the blow-out air temperature with respect to the change of opening of the air-mix door C is great and hence, changing of the air-mix door C can be prevented. In the range where the change ratio of the blow-out air temperature with respect to the change of opening of the air-mix door C is small, the time necessary for the air-, mix door C to reach the target opening of the air-mix door C can be reduced and hence, the responsiveness of the air-mix door C can be improved.

Incidentally, control means $E_5$ calculates the lower portion blow-out target air temperature from the output $T_5$ from the temperature setter $R_S$ and the output $T_{RL}$ from the room lower air temperature sensor $S_{RL}$, and outputs the control signal $V_W$ in accordance with the temperature difference value between the lower portion blow-out target air temperature and the actual blow-out air temperature $T_{DL}$ detected by a lower duct air temperature sensor $S_{DL}$.

An actuator $W_A$ controls the opening of a hot water valve W/C in accordance with this control signal $V_W$ and the re-heating capacity of the heater core B. In this manner, the blown air temperature of the blow-out conditioning air from the feet (floor) can be controlled.

As shown in FIGS. 2–6, in a motor driving type air-mix door control apparatus of the present invention, air sucked by a blower 1 is cooled by an evaporator 2 and a part of the cool air is heated by a heater core 3 and is mixed with the cool air which bypasses the heater core 3. The mixed air is blown out into a passenger compartment of the automobile from a vent discharge air duct port 7 or a floor discharge air duct port 8. An internal/external air switching door 10 selectively draws the external air from an external air introduction duct port 4 or the internal air from an internal air introduction duct port 5.

An air-mix door 11 is disposed in a cool air passage 31 which bypasses the heater core 3. A hot air passage 33 is disposed downstream of the heater core 3. Therefore, the cool air passing through the cool air passage 31 and the hot air passing through the hot air passage 33 are mixed together in a chamber C1.

The mixed air is blown upwards into the cabin from the vent discharge air duct port 7 towards the upper half of the body of a passenger and downwards into the passenger compartment from the floor discharge air duct port 8 towards the feet of the passenger. A floor door 13 opens and closes the floor discharge air duct port 8. A vent door 14 selects which of the vent discharge air duct port 7 and a defroster discharge air duct port 6 is to be opened.

A motor actuator 15 of three-position control type controls the internal/external air switching door 10. The internal/external air switching door 10 is selectively controlled to an internal air introduction position $S_1$, a semi-internal/external air introduction position $S_2$ and an external air introduction position $S_3$ when three electric contacts in a power supply passage for a motor inside the motor actuator 15 are controlled and changed over.

Figure 2:
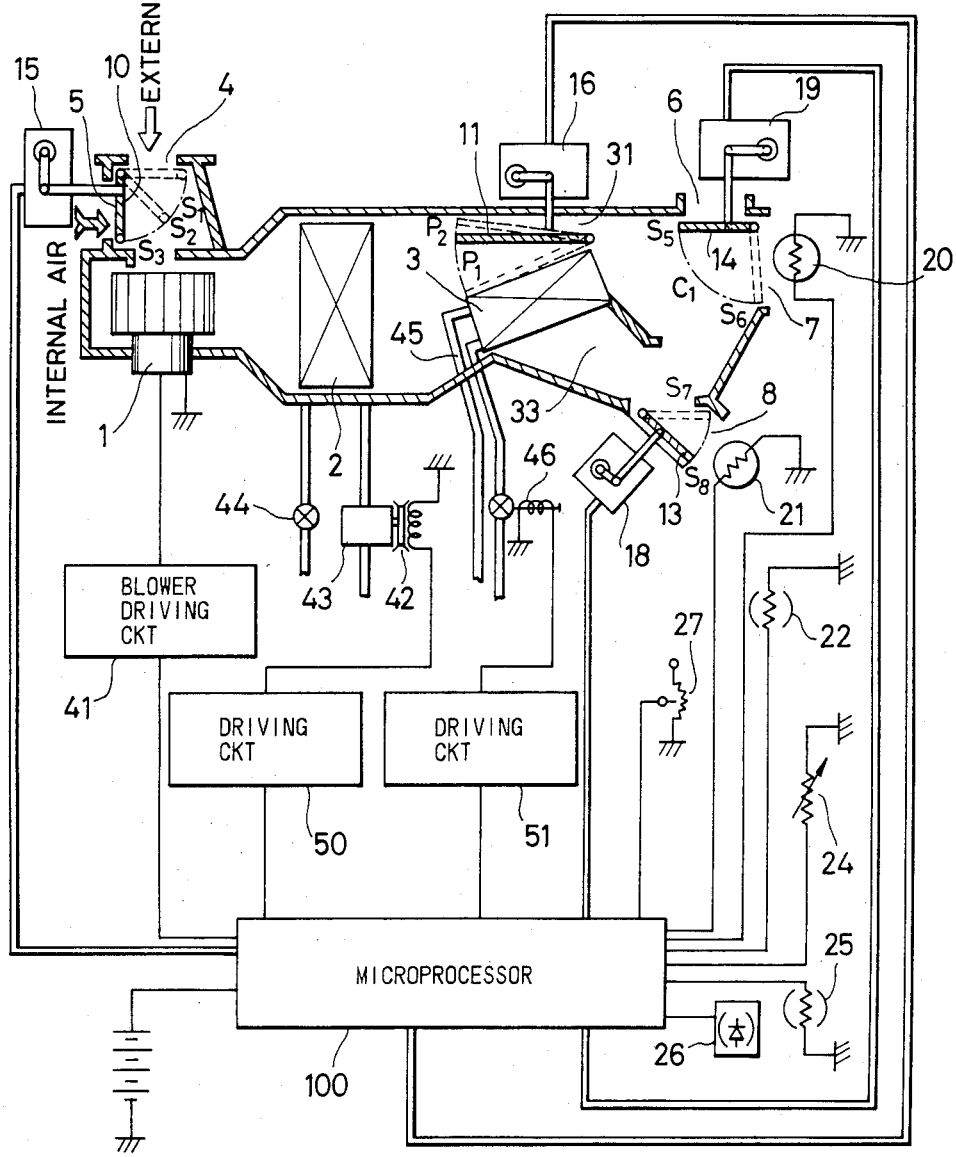
FIG. 2 is partially schematic cross-sectional view of one embodiment of the air-mix door control apparatus shown in FIG. 1.

The air-mix door 11 can be controlled by a motor actuator 16 with a built-in feedback potentiometer 27. In FIG. 2, the motor actuator 16 and the feedback potentiometer 27 are shown separated from each other for the sake of description of their functions. The opening of the air-mix door 11 is subjected to position control from the maximum cooling position $P_1$ to the maximum warming position $P_2$ by changeably controlling the impressed voltage to the motor terminal of the motor actuator 16 and its polarity.

The vent door 14 is operated by a two-positions control motor actuator 19. The On-Off and polarity of the impressed voltage to the motor terminal of the motor actuator 19 are controlled and changed over so that the vent door 14 should be at a vent position $S_5$ at which the vent discharge air duct port 7 is opened but the defroster discharge air duct port 6 is closed, or at a defroster position $S_6$ at which the vent discharge air duct port 7 is closed but the defroster discharge air duct port 6 is opened.

The floor door 13 is operated by the two-positions control motor actuator 18 in the same way as the vent door 14. Namely, the On-Off and the polarity of the impressed voltage to the motor terminal of the motor actuator 18 are controlled and changed over so that the floor door 13 should be at a position $S_8$ at which the floor discharge air duct port 8 is opened or at a position $S_7$ at which the floor discharge air duct port 8 is closed.

A microprocessor or an electric circuit 100 receives the signal from a vent discharge air temperature sensor 20 which detects the discharge air temperature from the vent discharge air duct port 7, the signal from a floor discharge air temperature sensor 21 which detects discharge air temperature discharged from the floor discharge air duct port 8, the signal from the passenger compartment air temperature sensor 22 which detects the passenger compartment air temperature, the signal from a temperature setting rheostat 24, an external air temperature sensor 25 and a solar ray sensor 26 including a photodiode, and the signal from the feedback potentiometer 27 which detects the actual position of the air-mix door 11.

The microprocessor 100 calculates and outputs the output signal which changes over and controls the opening and position of each of the internal/external switching door 10, the air-mix door 11, the floor door 13 and the vent door 14 to the operation environment of the air conditioner. The microprocessor 100 controls also the driving speed of the blower 1 through a blower driving circuit 41.

The microprocessor 100 controls the supply of power to a magnet clutch 42 through a driving circuit 50, controls the actuation and stop of a compressor 43 and controls further the flow of the cooling medium flowing into the evaporator 2 through an expansion valve 44. The microprocessor 100 outputs a signal which controls a hot water cock 46 disposed at an intermediate portion of a hot water passage 45 supplying the hot water to the heater core 3, and controls the hot water cock 46 through a driving circuit 51.

Figure 3:
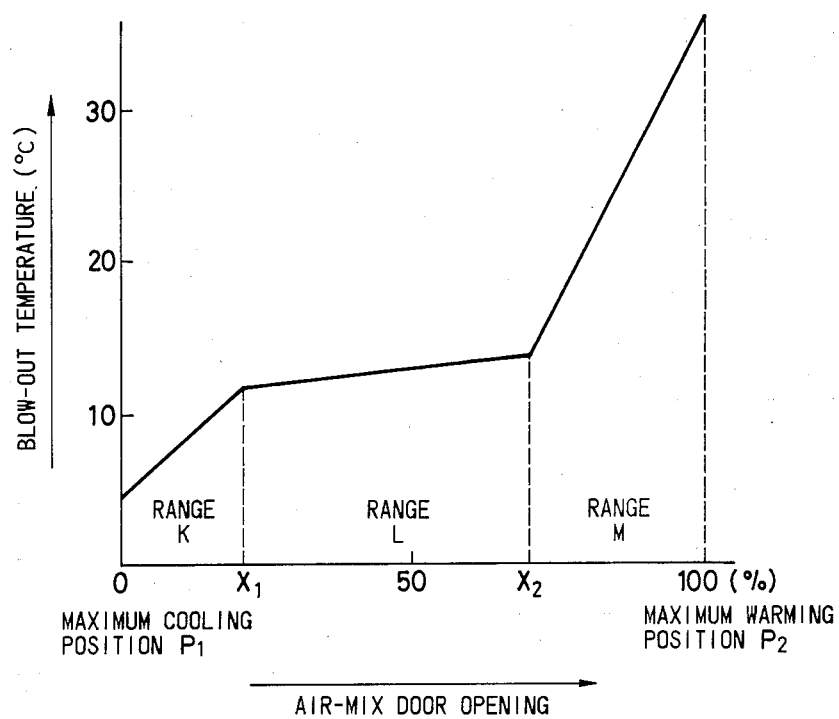
FIG. 3 is a graphical illustration of a relationship between the opening of the air-mix door and a blow-out air temperature.

FIG. 3 is a diagram showing the relationship between the opening of the air-mix door 11 and the blow-out air temperature in the air conditioner in this embodiment. Although the control between the opening of the air-mix door 11 and the vent discharge air temperature will be described, the control between the opening of air-mix door 11 and the floor discharge air temperature can be made similarly.

The change of the discharge air temperature with respect to the opening of the air-mix door 11 is not constant but can be divided into three ranges (K, L, M) in this embodiment in accordance with the gradient of the discharge air temperature with respect to the change of opening of the air-mix door 11. The boundary positions ($x_1$, $x_2$) of the respective ranges are determined and voltage values ($V_1$, $V_2$) corresponding to the resistance value of the feedback potentiometer 27, that in turn corresponds to the boundary positions ($x_1$, $x_2$) are stored in advance in the microprocessor 100.

Figure 4:
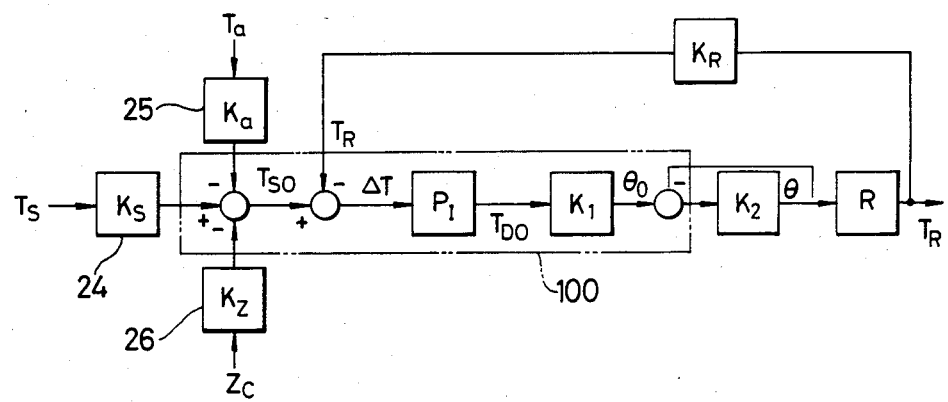
FIG. 4 is a schematic diagram of a temperature control system of the air conditioner.

Next, the opening $\theta$ of the air-mix door 11 is calculated in the following manner. The calculation process is shown in FIG. 4 which is a block diagram of automatic control of the air conditioning system.

When the set air temperature $T_S$ is determined by operating the temperature setting rheostat 24, the set air temperature $T_s$ is read into the microprocessor 100 as the voltage value corresponding to the set air temperature $T_s$.

The microprocessor 100 first subtracts a voltage value corresponding to the external air temperature $T_a$ and a voltage value corresponding to the solar radiation quantity $Z_c$ from the voltage value corresponding to the set air temperature $T_s$ and decides the target set air temperature $T_{so}$. Symbols $K_s$, $K_a$ and $K_z$ are all proportional constants when the air temperatures and the solar radiation quantity $Z_c$ are converted to the voltages. The target set air temperature $T_{so}$ decided in this manner is then compared with the output air temperature value of the room air temperature sensor 22 and their temperature difference value $\Delta T$ is determined.

The microprocessor 100 makes proportional integration of this temperature difference value $\Delta T$ in accordance with the following equation and calculates the target dischage air temperature $T_{do}$ to be discharged from the vent blow-out air duct port 7 (and the target set air temperature of the air to be blown out from the floor discharge air duct port 8):

$$T_{do} = K_p \left( \Delta T + \frac{1}{T_i} \int \Delta T dt \right) \tag{1}$$

where
$K_p$: proportional constant,
$T_i$: intergration constant.

Next, the microprocessor 100 compares the target discharge air temperature $T_{do}$ with the actual blow-out air temperature $T_d$ detected by the vent discharge air temperature sensor 20 and the floor discharge air temperature sensor 21 respectively, and calculates the target opening $\theta_o$ of the air-mix door 11 on the basis of their temperature difference value in accordance with the following equation:

$$\theta_o = K_1 (T_{do} - T_d) \tag{2}$$

where $K_1$: proportional constant.

The actual opening $\theta$ of the air-mix door 11 is detected by the feedback potentiometer 27, and is then corrected so that the actual opening $\theta$ of the air-mix door 11 is equal to the target opening $\theta_o$ of the air-mix door 11. Here, symbol $K_2$ is a proportional constant.

The resistance value $R_f$ for the actual opening $\theta$ of the air-mix door 11 detected by the feedback potentiometer 27 is converted to a voltage value $V_f$, and is then compared with the voltage value $V_o$ corresponding to the target opening $\theta_o$ of the air-mix door 11, thereby deciding the driving direction of the air-mix door 11.

When the voltage difference value ($V_f - V_o$) proves positive, the polarity of the impressed voltage to the motor of the motor actuator 16 is decided so that the air-mix door 11 is driven towards the maximum cooling position $P_1$.

When the voltage difference value ($V_f - V_o$) proves negative, the polarity of the impressed voltage to the motor of the motor actuator 16 is controlled and inversed so that the air-mix door 11 is driven towards the maximum warming position $P_2$.

When the voltage difference value ($V_f - V_o$) is zero, the target opening $\theta_o$ of the air-mix door 11 is judged to be equal to the actual opening $\theta$ of the air-mix door 11 so that the impressed voltage to the motor of the motor actuator 16 is made zero and the driving of the air-mix door 11 is stopped.

Figure 5:
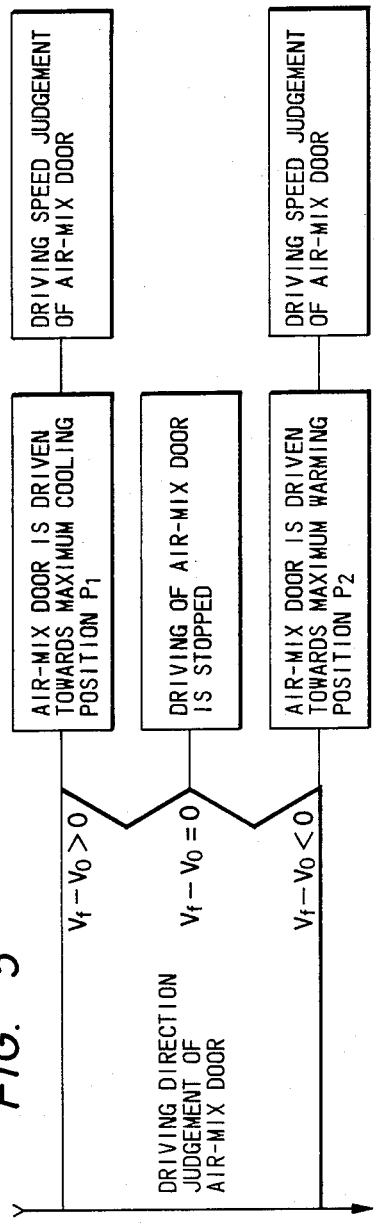
FIG. 5 is a flow-chart showing a judgement routine for judging the driving direction of the air-mix door.
Figure 6:
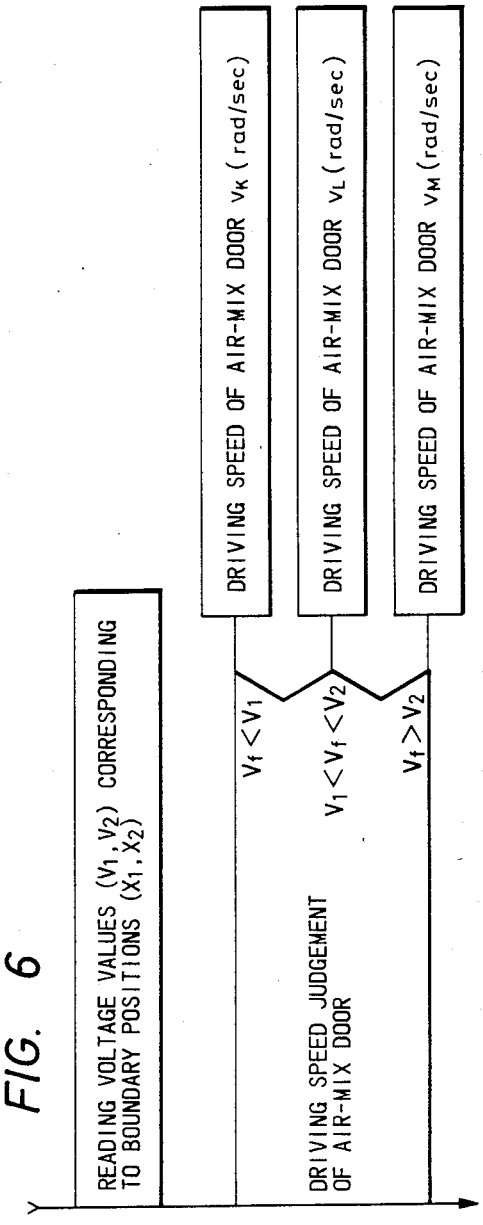
FIG. 6 is a flow-chart showing a judgement routine for judging the driving speed of the air-mix door.

FIG. 5 is a PAD (Problem Analysis Diagram) chart for judging the driving direction of the air-mix door 11. Here, the driving speed of the air-mix door 11 is further controlled when the air-mix door 11 is driven towards the maximum cooling position $P_1$ and the maximum warming position $P_2$, respectively. FIG. 6 is a PAD chart of a routine for judging the driving speed of the air-mix door 11.

First of all, the microprocessor 100 stores therein the voltage values ($V_1$, $V_2$) corresponding to the boundary positions ($x_1$, $x_2$) shown in FIG. 3, and the stored voltage values ($V_1$, $V_2$) are compared with the voltage value $V_f$ corresponding to the actual opening $\theta$ of the air-mix door 11 that is detected by the feedback potentiometer 27.

If $V_f < V_1$, the air-mix door 11 is in the K range shown in FIG. 3. Since the inclination of the actual discharge air temperature $T_d$ with respect to the change of the actual opening $\theta$ of the air-mix door 11 is great in this case, the impressed voltage to the motor terminal of the motor actuator 16 is reduced (10 V in this embodiment) in order to reduce the driving speed of the air mix door 11 to $V_k$ (rad/sec).

Next, if $V_1 < V_f < V_2$, the air-mix door 11 is in the L range. Since the inclination of the actual blow-out air temperature $T_d$ with respect to the change of actual opening $\theta$ of the air-mix door 11 is small in this case, the impressed voltage to the motor terminal of the motor actuator 16 is increased (12 V in this embodiment) in order to increase the driving speed of the air-mix door 11 to $V_L$ (rad/sec).

Next, if $V_f > V_2$, the air-mix door 11 is in the M range. Since the inclination of the actual discharge air temperature $T_d$ with respect to the change of actual opening $\theta$ of the air-mix door 11 is greater than that in the K range, the impressed voltage to the motor terminal of the motor actuator 16 is much more reduced (8 V in this embodiment) than in the case of $V_f < V_1$, and the driving speed of the air-mix door 11 is further reduced to $V_M$ (rad/sec). Here, each driving speed of the air-mix door 11 has the relationship $V_M < V_K < V_L$.

In this manner, the air-mix door 11 is controlled to the predetermined $\theta_o$ opening and the actual discharge air temperature $T_d$ becomes equal to the target discharge air temperature $T_{do}$.

In accordance with the embodiment described above, it is possible to make stable control of the motor actuator 16 in the range in which the change of the actual discharge air temperature $T_d$ is drastic with respct to the change of actual opening $\theta$ of the air-mix door 11, and to make control of the motor actuator 16 having high responsiveness in the range in which the change of the discharge air temperature $T_d$ with respect to the change of actual opening $\theta$ of the air-mix door 11 is gentle.

Incidentally, the relationship between the opening of the air-mix door and the discharge air temperature shown in FIG. 3 changes from air conditioner to air conditioner, but the above embodiment of the present invention can be applied to the various air conditioners without changing or modifying the construction of the motor actuator 16 by simply rewriting the voltage values ($V_1$, $V_2$) corresponding to the boundary positions ($x_1$, $x_2$) which voltage values are to be stored in the memory of the microprocessor 100.

Although the boundary positions are two, i.e. $x_1$ and $x_2$, in accordance with the present invention, the set number of the voltage values corresponding to the boundary positions can be increased within the allowance of the memory of the microprocessor 100 if the relationship between the opening the air-mix door and the blow-out air temperature is much more complicated.

I claim:

1. In an air-mix door control apparatus of an air conditioner for automobile including: an air-mix door for adjusting a mixing ratio of heated air and cooled air; control means for calculating and outputting a control signal for an opening degree of said air-mix door in accordance with an operating condition of the air conditioner; a motor for driving said air-mix door in accordance with the opening degree control signal of said control means; and speed correction means for correcting the rotational speed of said air-mix door control motor in accordance with the opening position of said air-mix door.

2. An air-mix door control apparatus of an air conditioner for automobile as defined in claim 1, wherein said air-mix door control motor speed correction means reduces an impressed voltage for driving said air-mix door control motor when a change ratio of a discharge air temperature with respect to the opening position of said air-mix door is great, and increases the impressed voltage for driving said air-mix door control motor when the change ratio of the discharge air temperature with respect to the opening position of said air-mix door is small.

3. In an air-mix door control apparatus of an air conditioner for automobile including: an air-mix door for adjusting a mixing ratio of heated air and cooled air; control means for calculating and outputting a control signal for an opening degree of said air-mix door in accordance with an operating condition of the air conditioner; a motor for driving said air-mix door in accordance with the opening degree control signal of said control means; judgement means for judging opening positions of said air-mix door; and speed correction means for controlling said air-mix door control motor at a driving speed corresponding to each opening position of said air-mix door judged by said air-mix door opening position judgement means.

4. An air-mix door control apparatus of an air conditioner for automobile as defined in claim 3, wherein said air-mix door control motor speed correction means reduces an impressed voltage for driving said air-mix door control motor when a change ratio of discharge air temperature with respect to the opening position of said air-mix door is great, and increases the impressed voltage for driving said air-mix door control motor when the change ratio of the discharge air temperature with respect to the opening position of said air-mix door is small.

5. An air-mix door control apparatus of an air conditioner for automobile comprising: an air-mix door for adjusting a mixing ratio of heated air and cooled air; control means for calculating and outputting a control signal for an opening degree of said air-mix door in accordance with an operating condition of the air conditioner; a motor for driving said air-mix door in accordance with the opening degree control signal of said control means; means for storing voltage values in boundary positions between a maximum cooling position and a maximum warming position of said air-mix door; means for comparing the voltage values of said storing means with voltage values corresponding to an actual opening degree of said air-mix door; and speed correction means for controlling said air-mix door control motor at a driving speed corresponding to each opening position between respective positions of said air-mix door.

6. An air-mix door control apparatus of an air conditioner for automobile as defined in claim 5, wherein said air-mix door control motor speed correction means reduces an impressed voltage for driving said air-mix door control motor when a change ratio of discharge air temperature with respect to the opening position of said air-mix door is great, and increases the impressed voltage for driving said air-mix door control motor when the change ratio of discharge air temperature with respect to the opening position of said air-mix door is small.

* * * * *